United States Patent [19]
Wood et al.

[15] 3,698,598
[45] Oct. 17, 1972

[54] SAFETY PRESSURE RELIEF DEVICE
[72] Inventors: Loren E. Wood, Tulsa; Marvin H. Free, Owasso, both of Okla.
[73] Assignee: Black, Sivalls & Bryson, Inc., Tulsa, Okla.
[22] Filed: July 26, 1971
[21] Appl. No.: 165,915

[52] U.S. Cl. ..................................220/89 A, 137/68
[51] Int. Cl. ..........................F16k 17/16, F17c 13/06
[58] Field of Search ..........................220/89 A; 137/68–71

[56] References Cited
UNITED STATES PATENTS

| 2,440,462 | 4/1948 | Cooper | 220/89 A |
| 2,954,897 | 10/1960 | Hansen et al. | 220/89 A |
| 2,958,184 | 11/1960 | Sanders | 220/89 A X |

*Primary Examiner*—Martin P. Schwadron
*Assistant Examiner*—Richard Gerard
*Attorney*—Dunlap, Laney, Hessin & Dougherty

[57] ABSTRACT

The present invention relates to an improved safety pressure relief device of the rupturable type comprising a rupture member which is of sufficient strength to rupture at a predetermined pressure having a concave-convex portion connected to an annular flat flange portion, a circular resilient sealing member positioned adjacent to and facing the concave side of said rupture member, the peripheral portion of said sealing member coinciding with the annular flat flange portion of said rupture member, and a flat circular support member positioned adjacent to the sealing member, the support member having slots radiating outwardly from a central portion and terminating short of the outer periphery thereof forming a plurality of sector shaped portions connected together at the central portion so that the support member provides support for the sealing member but readily ruptures and opens upon rupture of the rupture and sealing members. The outer peripheral edge of the support member is folded over the outer peripheral edges of the sealing and rupture members so that the members are rigidly held together.

7 Claims, 5 Drawing Figures

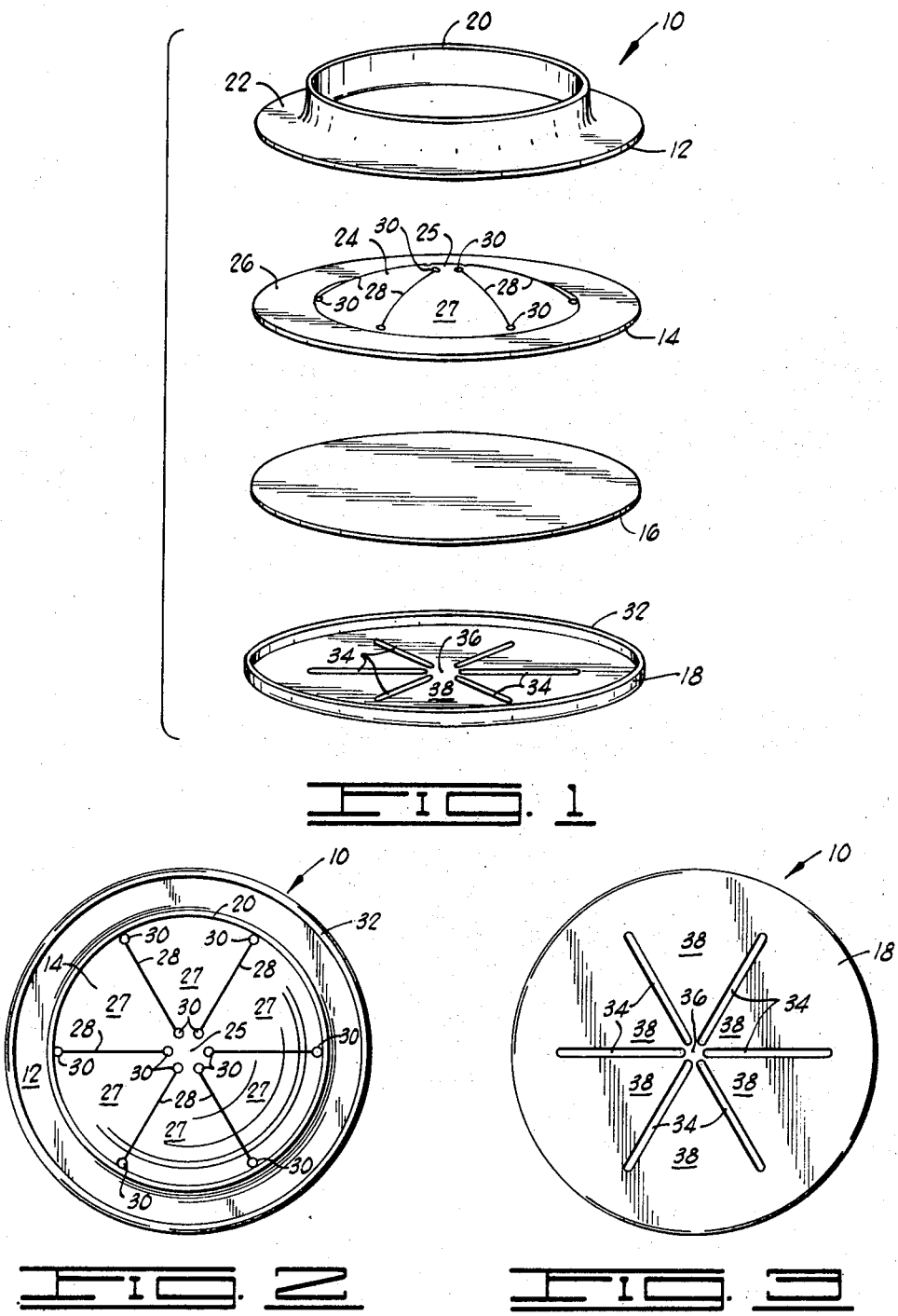

INVENTORS.
LOREN E. WOOD &
MARVIN H. FREE

SAFETY PRESSURE RELIEF DEVICE

BACKGROUND OF THE INVENTION

1. Field of the Invention

The present invention relates to the field of safety pressure relief devices of the rupturable disc type, and more particularly, but not by way of limitation, to a safety pressure relief device adapted to be used between flange members having opposed flat annular clamping surfaces.

2. Description of the Prior Art

Many various safety pressure relief devices of the rupturable type have been developed and used. Commonly, these devices include a rupture member or disc which is of sufficient strength to rupture at a predetermined pressure adapted to be clamped between a pair of clamping members and positioned across a relief passageway, such as in a conduit connected to a pressure system or vessel. Most safety pressure relief devices heretofore have required a special set of clamping members so that the rupture disc may be installed without being subjected to stress caused by the installation and the consequent reduction of accuracy of rupture pressure.

While safety pressure relief devices have been developed and used which are adaptable for installation between ordinary pipe flanges, tube couplings or unions these devices are generally comprises of many parts causing them to be relatively expensive to manufacture and further, because of the many parts, upon rupture of the devices parts may be broken away and moved downstream at high velocity with the release of pressure. Such loose parts may constitute a serious danger to personnel and equipment and further may become entrapped in valves or controls interfering with the operation thereof.

Safety pressure relief devices comprised of a top rupture member, a support member positioned beneath the rupture member and a resilient sealing member positioned between the rupture member and the support member are generally known, and are referred to in the art as composite rupture disc assemblies. The support member of most of these devices, which functions to support the sealing and rupture members and protect the device during pressure reversals, are made to support the entire underside of the sealing member and rupture member, and consequently, are formed of the same shape as the rupture member. Since most rupture members are dome-shaped or at least include a central concave-convex portion, the support member must also be dome-shaped making it relatively expensive to manufacture. While flat support members have been known and used heretofore, they are generally comprised of two or more parts which must be welded together making them relatively expensive to manufacture and subject to parts tearing away upon pressure release. Further, because such support members are made of several parts they are relatively thick, and particularly in low pressure applications, often do not achieve full opening upon rupture of the rupture and sealing members due to bending resistence.

By the present invention, a safety pressure relief device of the composite rupture disc type is provided which includes a minimum number of parts, which may readily be installed between ordinary pipe flanges and which includes a flat support member formed of a single part that readily achieves full opening upon rupture.

SUMMARY OF THE INVENTION

The present invention relates to a safety pressure relief device comprising a rupture member which is of sufficient strength to rupture at a predetermined pressure having a concave-convex portion connected to an annular flat flange portion, a circular resilient sealing member positioned facing the concave side of the rupture member, the peripheral portion of the sealing member coinciding with the annular flat flange portion of the rupture member and a flat circular support member positioned adjacent to said sealing member, the support member having slots radiating outwardly from a central portion and terminating short of the outer periphery thereof forming a plurality of sector shaped portions connected together at the central portion so that the support member provides support for the sealing member but readily ruptures and opens upon rupture of the rupture and sealing members. The outer peripheral edge of the support member is folded over the outer peripheral edges of the sealing and rupture members so that the members are rigidly held together.

It is, therefore, an object of the present invention to provide an improved safety pressure relief device of the rupturable type.

A further object of the present invention is the provision of a safety pressure relief device of the composite rupture disc type which may readily be installed between ordinary pipe flanges and which is comprised of a minimum number of parts.

Another object of the present invention is the provision of a safety pressure relief device of the composite rupture disc type which includes a flat support member formed of a single part that readily achieves full opening upon rupture of the device.

Still a further object of the present invention is the provision of a safety pressure relief device of the composite rupture disc type having a minimum number of parts which is inexpensive to manufacture and assemble and which is less susceptible to the formation of loose parts upon release of pressure.

Other and further objects and advantages of the present invention will be readily apparent from the following description of the preferred embodiments of the invention given for the purpose of disclosure and taken in conjunction with the accompanying drawings.

BRIEF DESCRIPTION OF THE DRAWINGS

FIG. 1 is an exploded perspective view showing the various parts of the safety pressure relief device of the present invention, FIG. 2 is a top plan view of the safety pressure relief device of the present invention, FIG. 3 is a bottom plan view of the device of the present invention.

DESCRIPTION OF THE PREFERRED EMBODIMENTS

Figure 4:
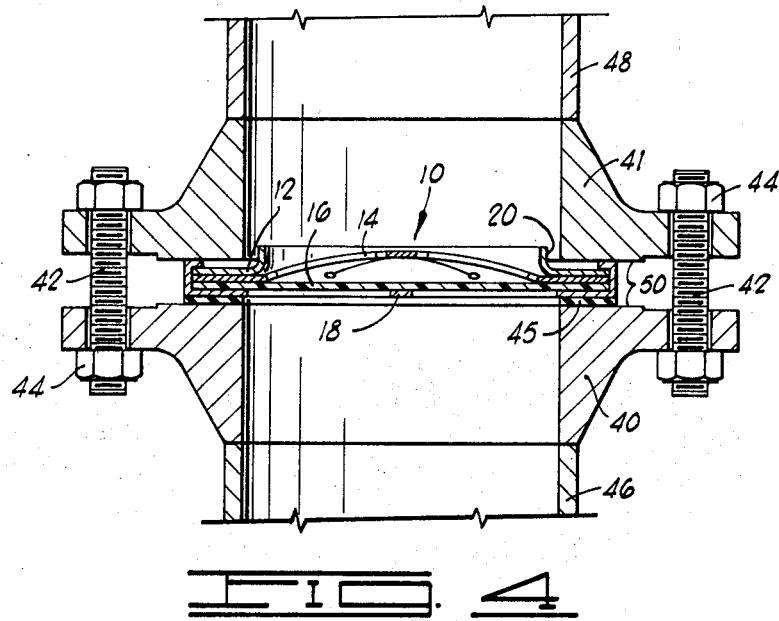
FIG. 4 is a vertical cross-sectional view of the safety pressure relief device of the present invention mounted between a pair of conventional pipe flanges.

Referring to the drawings, and specifically to FIG. 1, the safety pressure relief device of the present invention is shown and generally designated by the numeral 10. The device 10 includes an annular positioning member 12, a circular rupture member 14 positioned below the positioning member 12, a circular resilient sealing member 16 positioned below the rupture member 14, and a support member 18 positioned below the sealing member 16.

Referring to FIGS. 1 through 3, it may be seen that the positioning member 12 includes a central upstanding frusto-conical portion 20 and an annular flat flange portion 22.

The rupture member 14 includes a concave-convex portion 24 connected to an annular flat flange portion 26. The concave-convex portion 24 is provided with a plurality of slits 28 radiating outwardly from a central portion 25 and terminating short of flange portion 26 defining a plurality of sector shaped portions 27 therein. For ease of manufacture and to avoid sharp corners on the slits 28, apertures 30 may be provided at each of the extremities of each of the slits 28. However, if desired the apertures 30 may be omitted or slots may be utilized instead of slits.

Sealing member 16 is positioned between rupture member 14 and support member 18, and is advantageously formed of a resilient corrosion resistant material, e.g., a plastic material. The peripheral edges of the positioning member 12, rupture member 14 and sealing member 16 coincide, i.e., the diameters of the members 12, 14 and 16 are equal.

The support member 18 is formed of a flat circular member having a diameter greater than the diameters of the members 12, 14 and 16. A peripheral portion of the member 18 is folded upwardly to form an annular lip 32. Upon assembly of the members 12, 14, 16 and 18 in nesting relationship, the lip 32 is folded over the outer peripheral edges of the members 12, 14 and 16 as shown in FIG. 4 so that the members are rigidly clamped together. The flat circular portion of the support member 18 includes a plurality of slots 34 radiating outwardly from a central portion 36 and terminating short of the outer periphery thereof forming a plurality of sector shaped portions 38 connected together at the central portion 36.

Referring particularly to FIGS. 2 through 4, the assembled device 10 is illustrated. As previously described, the outer peripheral edge 32 of the support member 18 is folded over the outer peripheral edges of the members 12, 14 and 16 thereby rigidly holding the members together and forming a composite rupture disc assembly without the necessity of welding the parts together.

FIG. 4 illustrates the assembled device 10 positioned between a pair of conventional pipe flanges 40 and 41. Studs 42 and nuts 44 retain the flanges 40 and 41 in clamping engagement with the device 10 so that fluids under pressure contained within a conduit 46 connected to the flange 40 and to a pressure vessel or system (not shown), are prevented from passing into the flange 41 and a conduit 48 connected thereto. A conventional gasket 45 is positioned between the device 10 and the flange 40.

The flanges 40 and 41 include conventional raised face portions 50 which contact the annular flange portions of the device 10. The upstanding frusto-conical portion 20 of the positioning member 12 extends within the flange 41 thereby automatically positioning the device 10 centrally within the flanges 40 and 31 during installation. As shown in FIG. 4, a certain amount of misalignment may be tolerated in the positioning of the device 10 between the flanges 40 and 41 thereby allowing the device 10 to be positioned in rough forging or cast flanges having varying internal diameters. However, the positioning member 12 insures that the device 10 is positioned within the flanges 40 and 41 relatively centrally thereby insuring that the concave-convex portion of the rupture member 14 is not distorted upon the clamping of the device 10 and the bursting or rupture pressure changed accordingly.

In operation of the device 10 after being clamped between conventional flanges as shown in FIG. 4, pressure from the system or vessel being protected is exerted on the device 10 by way of conduit 46 and flange 40. Upon the exertion of pressure on the device 10, the resilient sealing member 16 deforms into contact with the concave surface of the rupture member 14. While the sealing member 16 adds strength to the device 10, the main variables for predetermining the rupture pressure of the unit are the thickness and the material of the rupture member 14, the proximity of the ends of the slits 28 or apertures 30 at the center portion of the rupture member 14 and/or the length of the slits 28. Upon pressure reversals, a condition commonly encountered through the temporary existence of a vacuum in the pressure vessel or system being protected or through the temporary exertion of pressure on top of the device 10, i.e., by way of conduit 48 and flange 41, the resilient sealing member 16 deforms into contact with the flat support member 18. The slots formed in the support member 18 are positioned such that the support member 18 can support the resilient sealing member 16 under a predetermined reverse pressure but will readily rupture and open upon rupture of the rupture member 14 and sealing member 16, as will be described further herein.

As is readily apparent form the drawings, the pressure exerted on the device 10 from the system or vessel being protected is communicated through the slots 34 of the support member 18 to the sealing member 16. The sealing member 16 contacts the concave surface of the rupture member 14 placing the rupture member 14 in tension. Upon reaching a pressure level which causes the tensile strength of the rupture member 14 to be exceeded, particularly the strength of the solid portions of the rupture member 14 between the central apertures 30, the rupture member 14 ruptures by the tearing of the portions between the central apertures 30. Due to the variances in material thickness and distances between the central apertures 30, all of the portions of the rupture member 14 between apertures 30 tear except for one such portion to which the central portion 25 thereof remains connected.

Upon rupture of the rupture member 14, the resilient member 16 also ruptures causing pressure to be relieved through the device 10. The force of the pressure release (the flow of fluid at high velocity through the device 10) causes the support member 18 to open.

That is, the tensile strength of the portions of the support member 18 lying between the inner ends of the slots 34 is exceeded by the force of fluid passing through the slots 34 thereby causing the support member 18 to tear between the inner ends of the slots 34. However, as described above for the rupture member 14, one portion of the support member 18 between two of the inner ends of the slots 34 remains intact to which the central portion 36 remains attached.

Figure 5:
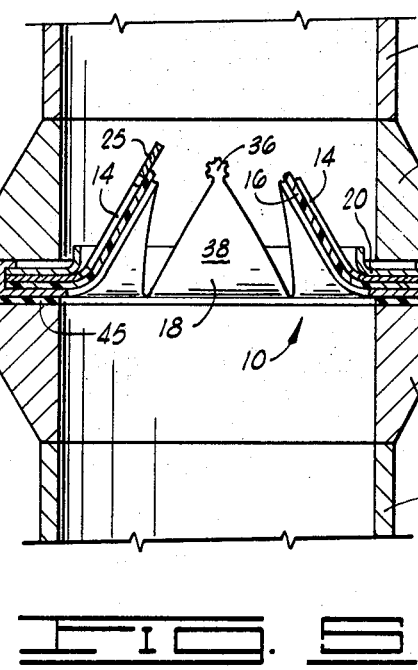
FIG. 5 is a vertical cross-sectional view of the safety pressure relief device of the present invention after the rupture thereof mounted between a pair of conventional pipe flanges.

As shown in FIG. 5, after rupture and initial pressure release, the safety pressure relief device 10 is opened with the sector shaped portions 27 of the rupture member 14 and the sector shaped portions 38 of the support member 18 bent upwardly thereby providing full pressure relief to the system or vessel protected. The central portion 25 of the rupture member 14 remains attached to one of the sector shaped portions 27 thereof and the central portion 36 of the support member 18 remains attached to one of the sector shaped portions 38 thereof.

As will be understood by those skilled in the art, upon rupture of the rupture member 14, the resilient sealing member 16 also ruptures in sector shaped portions substantially similar to the sector shaped portions 27 of the rupture member 14.

The device 10 may be made without the positioning member 12 without departing from the scope of the present invention. In this event, care should be taken in positioning the device 10, and the inner periphery of the flange 41 should be rounded at its lower edge so that it does not present a sharp corner to the rupture member 14.

Thus, it may be seen that the improved safety pressure relief device of the present invention is formed of a minimum number of parts which are individually relatively inexpensive to manufacture and which are rigidly held together in the assembled position without the necessity of welding or adhesives. The flat support member 18 of the device 10 is formed of a single flat part and of simple construction as compared to heretofore used support member which are not flat and/or which require two or more parts welded together.

As will be understood by those skilled in the art, the concave-convex portion 24 of the rupture member 14 may be weakened so that it ruptures without fragmentation in a variety of ways other than through the use of slits 38 and apertures 30. For example, scores, grooves, slots, etc., may be substituted for the slits 28 defining a plurality of sector shaped portions defining a single circular portion which remains connected to the rupture member 14 upon rupture.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art.

What is claimed is:

1. In a safety pressure relief device of the rupturable type supported between inlet and outlet supporting members, the improvement comprising:

a rupture member which is of sufficient strength to rupture at a predetermined pressure having a concave-convex portion connected to annular flat flange portion;

a circular resilient member positioned adjacent to and facing the concave side of said rupture member, the peripheral portion of said sealing member coinciding with said annular flat flange portion of said rupture member;

a flat circular support member positioned adjacent to said sealing member, said support member having slots radiating outwardly from a central portion and terminating short of the outer periphery thereof forming a plurality of sector shaped portions therein connected together at said central portion so that said support member provides support for said sealing member but readily ruptures and opens upon rupture of said rupture and sealing members; and the outer peripheral edge of said support member being folded over the outer peripheral edges of said sealing and rupture members so that said members are rigidly held together.

2. The apparatus of claim 1 wherein the concave-convex portion of said rupture member includes slits formed therein radiating outwardly from a central portion thereof to near said annular flat flange portion of said rupture member thereby defining a plurality of sector shaped portions so that upon rupture tearing takes place between the inner ends of said slits allowing said rupture member to open without fragmentation.

3. The apparatus of claim 2 wherein the concave-convex portion of said rupture member includes apertures formed therein positioned at each of the extremities of each of said slits.

4. The apparatus of claim 3 which is further characterized to include a circular positioning member having a central upstanding frusto-conical portion for positioning said member centrally between said supporting members connected to an annular flat flange portion, said positioning member positioned adjacent to the convex surface of said rupture member with the annular flat flange portion thereof coinciding with the annular flat flange portion of said rupture member and the outer peripheral edge thereof fitted under the folded peripheral edge of said support member.

5. A safety pressure relief device adapted to be clamped between a pair of supporting flanges having opposed flat annular clamping surfaces which comprises:

a circular positioning member having a central upstanding frusto-conical portion for positioning said member centrally between said supporting flanges, said frusto-conical portion being connected to an annular flat flange portion;

a rupture member which is of sufficient strength to rupture at a predetermined pressure having a concave-convex portion connected to a flat annular flange portion, the annular flat flange portion of said rupture member lying adjacent to and coinciding with the annular flat flange portion of said positioning member;

a circular resilient sealing member positioned facing the concave surface of said rupture member, the peripheral portion of said sealing member coinciding with the annular flat flange portion of said rupture member;

a flat circular support member positioned adjacent to said sealing member, said support member having slots radiating outwardly from a central portion thereof and terminating short of the outer periphery thereof thereby forming a plurality of sector shaped portions in said support member connected together at said central portion so that said support member provides support for said sealing member but readily ruptures and opens upon rupture of said rupture and sealing members; and the outer peripheral edge of said support member being folded over the outer peripheral edges of said sealing member, rupture member and positioning member so that said members are rigidly held together.

6. The apparatus of claim 5 wherein the concave-convex portion of said rupture member includes slits formed therein radiating outwardly from a central portion thereof to near said annular flat flange portion of said rupture member thereby defining a plurality of sector shaped portions so that upon rupture tearing takes place between the inner ends of said slits allowing said rupture member to open without fragmentation.

7. The apparatus of claim 6 wherein the concave-convex portion of said rupture member includes apertures formed therein positioned at each of the extremities of each of said slits.

* * * * *